(12) United States Patent
Lin et al.

(10) Patent No.: US 8,775,335 B2
(45) Date of Patent: Jul. 8, 2014

(54) PRIVACY-AWARE ON-LINE USER ROLE TRACKING

(75) Inventors: Ching-Yung Lin, Forest Hills, NY (US); Hanghang Tong, Ossining, NY (US); Fei Wang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/198,790

(22) Filed: Aug. 5, 2011

(65) Prior Publication Data

US 2013/0036116 A1 Feb. 7, 2013

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 6,751,657 B1 | 6/2004 | Zothner | |
| 6,907,427 B2 * | 6/2005 | Franz et al. | 1/1 |
| 7,181,441 B2 | 2/2007 | Mandato | |
| 7,213,032 B2 | 5/2007 | Mascarenhas | |
| 7,243,105 B2 | 7/2007 | Thint | |
| 7,548,985 B2 | 6/2009 | Guigui | |
| 7,594,193 B2 | 9/2009 | Thomas | |
| 8,015,003 B2 * | 9/2011 | Wilson et al. | 704/226 |
| 8,090,665 B2 * | 1/2012 | Yang et al. | 705/319 |
| 8,356,086 B2 * | 1/2013 | Liu et al. | 709/220 |
| 8,498,949 B2 * | 7/2013 | Huh et al. | 706/12 |
| 8,515,879 B2 * | 8/2013 | Huh et al. | 706/12 |
| 2005/0188423 A1 | 8/2005 | Motsinger et al. | |
| 2006/0036680 A1 | 2/2006 | Shim | |
| 2006/0073891 A1 | 4/2006 | Holt | |
| 2006/0085419 A1 | 4/2006 | Rosen | |
| 2007/0255736 A1 * | 11/2007 | Chakrabarti et al. | 707/101 |

(Continued)

OTHER PUBLICATIONS

Lars omlor ad Jean-Jaques Slotine, Continuous Non-Negative Matrix Factorization for Time-Dependent Data, 17th European Signal Processing Conference, published Aug. 24, 2008, pp. 1928-1932.*

(Continued)

*Primary Examiner* — Jeffrey A Burke
(74) *Attorney, Agent, or Firm* — Anne V. Dougherty; Otterstedt, Ellenbogen & Kammer, LLP

(57) ABSTRACT

Access is obtained to a first nonnegative factor matrix and a second nonnegative factor matrix obtained by factorizing a nonnegative asymmetric matrix which represents a set of data which tracks time-stamped activities of a plurality of entities. The first nonnegative factor matrix is representative of initial role membership of the entities, and the second nonnegative factor matrix is representative of initial role activity descriptions. At a given one of the time stamps, while holding a change in the first nonnegative factor matrix constant, a change in the second nonnegative factor matrix is updated to reflect time variance of the set of data at the given one of the time stamps, without accessing actual data values at previous ones of the time stamps. At the given one of the time stamps, while holding a change in the second nonnegative factor matrix constant, a change in the first nonnegative factor matrix is updated, to reflect the time variance of the set of data at the given one of the time stamps, without accessing the actual data values at the previous ones of the time stamps. The role membership of the entities and the role activity descriptions, at the given one of the time stamps, are updated based on the updating steps. A suitable technique for nonnegative symmetric matrices is also provided.

22 Claims, 10 Drawing Sheets

TECHNIQUE 2 eNMF

Require: Initialization $\Delta F^{(0)}, \Delta G^{(0)}$.
Ensure: $\Delta F^{(0)} \geq 0, \Delta G^{(0)} \geq 0$
  for $t = 1, 2, \ldots$ do
    Fix $\Delta F = \Delta F^{(t-1)}$, update $\Delta G^{(t)}$ using PG
    Fix $\Delta G = \Delta G^{(t)}$, update $\Delta F^{(t)}$ using PG
  end for

(56) References Cited

U.S. PATENT DOCUMENTS

| | | | |
|---|---|---|---|
| 2007/0255737 | A1* | 11/2007 | Chakrabarti et al. .......... 707/101 |
| 2007/0288465 | A1* | 12/2007 | Aggarwal et al. ............... 707/10 |
| 2008/0288551 | A1 | 11/2008 | Van De Sluis |
| 2008/0294684 | A1* | 11/2008 | Chi et al. ................... 707/103 R |
| 2009/0182873 | A1 | 7/2009 | Spalink et al. |
| 2009/0271433 | A1 | 10/2009 | Perronnin et al. |
| 2010/0076913 | A1* | 3/2010 | Yang et al. ...................... 706/13 |
| 2010/0094612 | A1 | 4/2010 | Weerasinghe |
| 2010/0169176 | A1 | 7/2010 | Turakhia |
| 2010/0299379 | A1 | 11/2010 | Das Gupta et al. |
| 2010/0313009 | A1 | 12/2010 | Combet et al. |
| 2011/0066730 | A1 | 3/2011 | Julia et al. |
| 2012/0041905 | A1* | 2/2012 | Huh et al. ....................... 706/12 |
| 2012/0041906 | A1* | 2/2012 | Huh et al. ....................... 706/12 |

OTHER PUBLICATIONS

Fei Wang et al., Towards Evolutionary NonNegative Matrix Factorization, Proceedings of teh 25th AAAI Conference on Artificial Intelligence, published Aug. 4, 2011.*

Cao et al., Detect and Track Latent Factors with Online Nonnegative Matrix Factorization, IJCAI 2007, published 2007.*

Cao, B.; et al. "Detect and track latent factors with online nonnegative matrix factorization". IJCAI 2007, 2689-2694.

Elsner et al.; "Protecting user privacy in WiFi sharing networks"; 2010 IEEE Globecom Workshops (GC'10); 2010; ISBN: 978-1-4244-8863-6; Publisher: IEEE.

Lee, D. D., and Seung, H. S. "Learning the parts of objects by non-negative matrix factorization". Nature 401, Oct. 1999, (6755):788-791.

Anttila, P. "Source identification of bulk wet deposition in finland by positive matrix factorization". Atmospheric Environment, vol. 29, Issue 14, P1705-1718, 1995.

Bertsekas, D. P. Nonlinear Programming. Athena Scientific, 2nd edition. 1999.

Chi, Y.et al, "Evolutionary spectral clustering by incorporating temporal smoothness". In KDD '07: Proc. of the 12th ACM SIGKDD Inter'l conference on Knowledge discovery 2007.

Dhillon, I. S., and Sra, S. 2005. Generalized nonnegative matrix approximations with Bregman divergences. In Advances in Neural Information Proc. Systems, 283-290.

Ding, C.et al. "Orthogonal nonnegative matrix t-factorizations for clustering". In Proc. of the 12th ACM SIGKDD international conference, 126-135 2006.

Ding, C.; Li, T.; and Jordan, M. I. "Convex and Semi-Nonnegative Matrix Factorizations". IEEE Transactions on Pattern Analysis and Machine Intelligence 32(1):45-55. 2010.

Eggert, J., and Korner, E. 2004. Sparse coding and nmf. In Proceedings of IEEE International Joint Conference on Neural Networks, vol. 4, 2529-2533.

F'evotte, C., and Idier, J. 2010. Algorithms for nonnegative matrix factorization with the beta-divergence. CoRR abs/1010.1763.

Guillamet, D.et al. "A weighted non-negative matrix factorization for local representations". In Proceedings of IEEE Computer Society Conference on CVPR, 2001, vol. 1, 942-947.

Kim, H., et al. "Nonnegative matrix factorization based on alternating . . . ". SIAM Journal on Matrix Analysis and Applications 30(2): 713-730, 2008.

Lee, D. D., and Seung, H. S. 2001. Algorithms for Nonnegative Matrix Factorization. In Advances in Neural Information Processing Systems 13, 556-562. MIT Press.

Lin, C.-J. 2007. Projected Gradient Methods for NonnegativeMatrix Factorization. Neural Comp. 19(10):2756-2779.

Shahnaz, F.; Berry, M. W.; Pauca; and Plemmons, R. J. 2006. Document clustering using nonnegative matrix factorization. Information Processing & Management 42(2):373-386.

Wang, F.; Li, T.; Wang, X.; Zhu, S.; and Ding, C. 2010. Community discovery using nonnegative matrix factorization. Data Mining and Knowledge Discovery.

Wang, F.; Li, P.; and Konig, C. 2011. Efficient document clustering via online nonnegative matrix factorization. In Proceedings of the 11th SIAM Conference on Data Mining.

D. Achlioptas and F.McSherry. "Fast computation of low-rank matrix approximations". J. ACM, 54(2), 2007.

Xiaowei Ying and Xintao Wu. "Randomizing Social Networks: a Spectrum Preserving Approach". SDM 2008.

Mark Manulis, et al. "Privacy-Preserving Group Discovery with Linear Complexity". ACNS 2010.

Yehuda Lindell, et al. "Privacy Preserving Data Mining". Advances in Cryptology—Crypto '00 Proceedings. 2000.

H. Tong, et al. "Colibri: fast mining of large static and dynamic graphs". In KDD, pp. 686-694, 2008.

J. Sun, Y. Xie, H. Zhang, and C. Faloutsos. "Less is more: Compact matrix decomposition for large sparse graphs". In SDM, 2007.

* cited by examiner

FIG. 1

| TECHNIQUE 1 |
| --- |
| PROJECT GRADIENT |
| Require: $0 < \beta < 1$, $0 < \sigma < 1$. Initialization $A^{(0)}$.<br>Ensure: $A^{(0)} \geq B$<br>  for $k = 1, 2, \ldots$ do<br>    $A^{(k)} = P_B [A^{(k-1)} - \alpha_k \nabla f (A^{(k-1)})]$<br>    where $\alpha_k = \beta^{t_k}$, and $t_k$ is the first nonnegative integer for which<br>$f(A^{(k)}) - f(A^{(k-1)}) \leq \sigma \langle \nabla f(A^{(k-1)}), (A^{(k)} - A^{(k-1)}) \rangle$  (12)<br>  end for |

FIG. 2

| TECHNIQUE 2 |
| --- |
| eNMF |
| Require: Initialization $\Delta F^{(0)}$, $\Delta G^{(0)}$.<br>Ensure: $\Delta F^{(0)} \geq 0$, $\Delta G^{(0)} \geq 0$<br>  for $t = 1, 2, \ldots$ do<br>    Fix $\Delta F = \Delta F^{(t-1)}$, update $\Delta G^{(t)}$ using PG<br>    Fix $\Delta G = \Delta G^{(t)}$, update $\Delta F^{(t)}$ using PG<br>  end for |

FIG. 3

TECHNIQUE 3

| eSNMF |
|---|
| Require: $0 < \beta < 1$, $0 < \sigma < 1$. Initialization $\Delta \mathbf{G}^{(0)}$.<br>Ensure: $\Delta \mathbf{G}^{(0)} \geq -\mathbf{G}$<br>  for $k = 1, 2, ...$ do<br>    $\Delta \mathbf{G}^{(k)} = P_{-\mathbf{G}}[\Delta \mathbf{G}^{(k-1)} - \alpha_k \nabla \mathcal{J}_S^e(\Delta \mathbf{G}^{(k-1)})]$<br>    where $\alpha_k = \beta^{t_k}$, and $t_k$ is the first nonnegative integer<br>    for which<br>  $\mathcal{J}_S^e(\Delta \mathbf{G}^{(k)}) - \mathcal{J}_S^e(\Delta \mathbf{G}^{(k-1)}) \leq \sigma \left\langle \nabla \mathcal{J}_S^e(\Delta \mathbf{G}^{(k-1)}), (\Delta \mathbf{G}^{(k)} - \Delta \mathbf{G}^{(k-1)}) \right\rangle$<br>  end for |

FIG. 4

SUMMARY OF THE DATA SETS

| NAME | n x n (n x d) | m | T | $\hat{m}$ |
|---|---|---|---|---|
| *AAAI-AP* | 3,659 x 2,651 | 5,762 | 9 | 265 |
| *KDD-AP* | 1,974 x 1,118 | 3,202 | 7 | 256 |
| *SIGIR-AP* | 2,489 x 1,867 | 4,584 | 22 | 124 |
| *NIPS-AP* | 3,417 x 2,927 | 7,111 | 13 | 355 |
| *AAAI-AA* | 3,659 x 3,659 | 10,849 | 9 | 5,059 |
| *KDD-AA* | 1,974 x 1,974 | 3,717 | 7 | 5,639 |
| *SIGIR-AA* | 2,489 x 2,489 | 3,957 | 22 | 6,336 |
| *NIPS-AA* | 3,417 x 3,417 | 6,063 | 13 | 6,860 |

PRIVACY-AWARE ON-LINE USER ROLE TRACKING

STATEMENT OF GOVERNMENT RIGHTS

This invention was made with Government support under Contract No.: W911NF-09-2-0053 (Army Research Office (ARO)). The Government has certain rights in this invention.

CROSS-REFERENCE TO RELATED APPLICATIONS

Not Applicable.

FIELD OF THE INVENTION

The present invention relates to the electrical, electronic and computer arts, and, more particularly, to analytics, optimization, and the like.

BACKGROUND OF THE INVENTION

Detecting and tracking latent factors from temporal data is of interest in a variety of applications. Nonnegative Matrix Factorization (NMF) has been employed in some cases for such detection and tracking.

SUMMARY OF THE INVENTION

Principles of the invention provide techniques for privacy-aware on-line user role tracking. As used herein, "privacy aware" means in a manner that is sensitive to and respectful of people's privacy. In one aspect, an exemplary method for analyzing a set of data (in the form of a nonnegative asymmetric matrix) which tracks time-stamped activities of a plurality of entities includes the step of obtaining access to a first nonnegative factor matrix and a second nonnegative factor matrix obtained by factorizing the nonnegative asymmetric matrix. The first nonnegative factor matrix is representative of initial role membership of the entities, and the second nonnegative factor matrix is representative of initial role activity descriptions. A further step includes, at a given one of the time stamps, while holding a change in the first nonnegative factor matrix constant, updating a change in the second nonnegative factor matrix, to reflect time variance of the set of data at the given one of the time stamps, without accessing actual data values at previous ones of the time stamps. A still further step includes at the given one of the time stamps, while holding a change in the second nonnegative factor matrix constant, updating a change in the first nonnegative factor matrix, to reflect the time variance of the set of data at the given one of the time stamps, without accessing the actual data values at the previous ones of the time stamps. An even further step includes updating the role membership of the entities and the role activity descriptions, at the given one of the time stamps, based on the updating steps.

In another aspect, an exemplary method for analyzing a set of data (in the form of a nonnegative symmetric matrix) which tracks time-stamped activities of a plurality of entities, includes the step of obtaining access to a nonnegative factor matrix, obtained by factorizing the nonnegative symmetric matrix. The nonnegative factor matrix is representative of initial role membership of the entities. Possession of a matrix inherently implies possession of its transpose as well. Further steps include, at a given one of the time stamps, updating a change in the nonnegative factor matrix, to reflect time variance of the set of data at the given one of the time stamps, without accessing actual data values at previous ones of the time stamps; and updating the role membership of the entities, at the given one of the time stamps, based on the updating step.

As used herein, "facilitating" an action includes performing the action, making the action easier, helping to carry the action out, or causing the action to the performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least ore processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide Evolutionary Nonnegative Matrix Factorization (eNMF) with one or more of the following advantages:

- eNMF is space efficient, as eNMF only needs to hold the difference matrix, which is usually much sparser due to the smoothness assumption.
- eNMF is computationally efficient; one major computational cost in NMF the matrix-matrix multiplications, whereas eNMF achieves computational savings by using a much sparser matrix in such matrix-matrix multiplications.
- eNMF is privacy-friendly, since eNMF does not need to know the exact data feature matrix. It only requires the factorized matrices at the initial time stamp and the difference data feature matrix. This is particularly useful for those privacy-sensitive applications. e.g., the data feature is only available for a short time window.
- eNMF can be applied to different types of data; for example, two instantiations are provided for both traditional asymmetric NMF (where the feature matrix is rectangular) and symmetric NMF (where the feature matrix is symmetric square, e.g. data similarity matrix).

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 shows pseudo-code for a first technique (projected gradient), according to an aspect of the invention;

FIG. 2 shows pseudo-code for a second technique (eNMF), according to an aspect of the invention;

FIG. 3 shows pseudo-code for a third technique (eSNMF), according to an aspect of the invention;

FIG. 4 is a table summarizing exemplary experimental data sets;

DETAILED DESCRIPTION OF PREFERRED EMBODIMENTS

Figure 5:
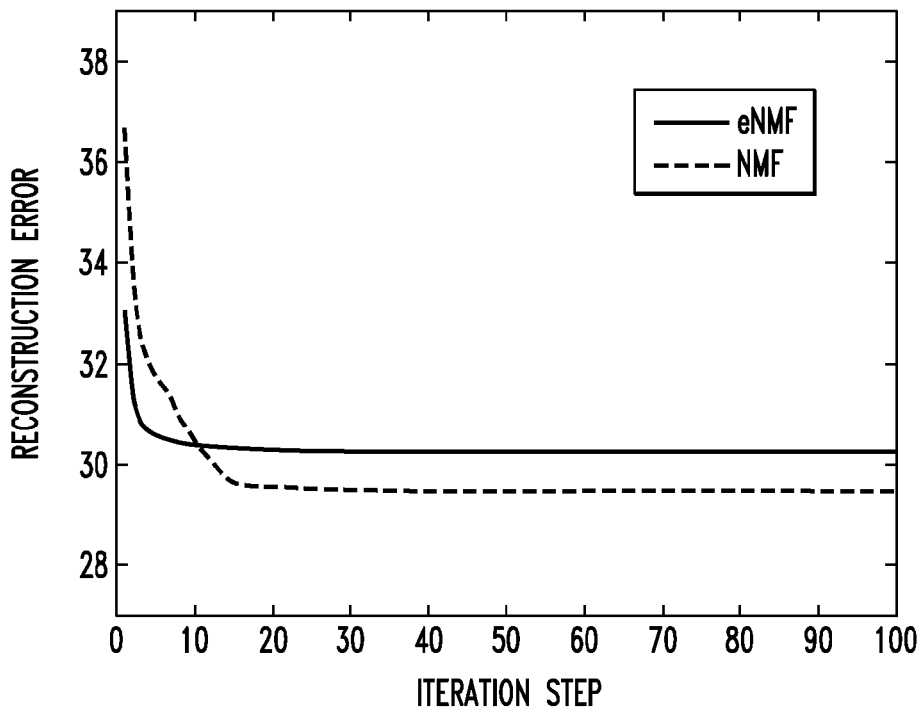
FIG. 5 shows reconstruction error versus iteration steps, on NIPS-AA data, using eNMF.

Nonnegative Matrix Factorization (NMF) techniques have aroused considerable interests from the field of artificial intelligence in recent years because of their good interpretability and computational efficiency. However, in many real world applications, the data features usually evolve smoothly over time. In such cases, it would be very expensive in both computation and storage to rerun the whole NMF procedure after each time when the data feature(s) change.

One or more embodiments advantageously provide Evolutionary Nonnegative Matrix Factorization (eNMF), which incrementally updates the factorized matrices in a computation and space efficient manner with the variation of the data matrix. One or more instances provide such an evolutionary procedure for both asymmetric and symmetric NMF. The results of non-limiting exemplary experiments on several real world data sets are provided to demonstrate the efficacy and efficiency of eNMF in one or more embodiments.

As noted, recent years have witnessed a surge of interest in Nonnegative Matrix Factorization (NMF) from the artificial intelligence field. Different from traditional spectra decomposition methods such as Principal Component Analysis (PCA) and Singular Value Decomposition (SVD). NMF is usually additive, which results in better interpretation ability, and does not require the factorized latent spaces to be orthogonal, which allows more flexibility to adapt the representation to the data set. NMF has successfully been used in many real world applications, such as information retrieval, environmental study, computer vision and computational social/network science.

Formally, NMF factorizes a nonnegative data matrix into the product of two (low-rank) nonnegative latent matrices. As NMF requires both factorized matrices to be nonnegative, this will generally lead to sparse, part-based representation of the original data set, which is semantically much more meaningful compared to traditional factorization/basis learning methods. Due to the empirical and theoretical success of NMF, people have been working on NMF extensions in the last decade to fit in more application scenarios. Some representative techniques include nonnegative sparse coding, semi and convex NMF, and orthogonal tri-NMF.

Many techniques have been proposed to solve NMF, such as multiplicative updates, active set, and projected gradient. However, all these techniques require holding the whole data matrix in main memory in the entire NMF process, which is quite inefficient in terms of storage cost when the data matrix is large (either in data size or the feature dimensionality). To address this issue, several researchers proposed memory efficient online implementations for NMF in recent years. Rather than processing all data points in a batch mode, these approaches process the data points one at a time in a streaming fashion. Thus they only require the memory to hold one data point through the whole procedure.

One or more embodiments address NMF in another scenario where the data features are evolving over time. Note that the difference between this setting and online learning is that in online learning, the data points are processed one by one, i.e., the elements in the data matrix are changed one column at a time. However, in one or more embodiments, any elements in the data matrix are allowed to change from time to time. A straightforward solution is to rerun the whole NMF procedure at each time stamp when the data feature(s) change. However, this poses several challenges in terms of space cost, computational time as well as privacy.

Let $X$ and $\tilde{X}=X+\Delta X$ be the old and new data feature matrices respectively. In many real applications, $\Delta X$ is usually very sparse while $\tilde{X}$ is not. Even is $\tilde{X}$ also sparse, it is usually much denser compared with the $\Delta X$ matrix. See the table of FIG. 4 for some examples. It therefore is not efficient in terms of space cost to re-run NMF since it is necessary to store the whole data feature matrix $\tilde{X}$. It is also not efficient in computation since it requires some matrix-matrix multiplication between $\tilde{X}$ and the two factorized matrices. What is more, this strategy becomes infeasible for those privacy-sensitive applications where the whole data feature matrix $\tilde{X}$ might not be available at a given time stamp. For instance, Facebook's privacy policy prohibits the user from keeping the downloaded data longer than 24 hours. Thus, if a data analyst wants to track the community structure on a daily basis, he or she would only have access to the data feature within a 24 hour window.

For evolutionary data, one common assumption is that the data features evolve smoothly over time, i.e., the norm of the difference between the data feature matrices at two consecutive time stamps is very small. Based on this assumption, one or more embodiments provide an Evolutionary Nonnegative Matrix Factorization (eNMF) technique, where it is assumed that the factorized matrices also evolve smoothly over time. Instead of minimizing a new similar objective on the evolved feature matrix, eNMF minimizes an upper bound of the objective, and one or more embodiments further provide an efficient projected gradient method to address this issue. As noted, non-limiting exemplary experimental results are presented to demonstrate the efficacy and efficiency of eNMF.

Problem Formulation

Consider a nonnegative matrix $X \in \mathbb{R}^{n \times d}$, which it is desired to factorize into the product of two nonnegative matrices $F \in \mathbb{R}^{n \times k}$ and $G \in \mathbb{R}^{d \times k}$ ((usually k>>min (d, n)) under some loss. The exemplary embodiment concentrates on the Frobenius norm loss as it is one of the most popular loss forms. However, techniques under other loss forms can be derived in a similar manner:

Kullback-Leighbler divergence (Lee, D. D and Seung, H. S., Algorithms for Nonnegative Matrix Factorization, in *Advances in Neural Information Processing Systems* 13, 556-562, MIT Press, 2001) (expressly incorporated herein by reference in its entirety for all purposes), β-divergence (F'evotte, C., and Idier, J., Algorithms for nonnegative matrix factorization with the beta-divergence, CoRR abs/1010.1763, 2010) (expressly incorporated herein by reference in its entirety for all purposes), and Bregman divergence (Dhillon, I. S., and Sra, S., Generalized nonnegative matrix approximations with Bregman divergences, in *Advances in Neural information Proc. Systems*, 283-290, 2005) (expressly incorporated herein by reference in its entirety for all purposes).

The optimization problem to be solved is:

$$\min_{F \geq 0, G \geq 0} \|X - FG^T\|_F^2 \quad (1)$$

where $\|A\|_F^2 = \text{tr}(A^T A)$ is the square of the matric Frobenius norm. This problem can be solved via a variety of techniques; for example:

- multiplicative updates (Lee and Seung, Algorithms for Nonnegative Matrix Factorization, supra),
- active set method (Kim, H., and Park, H., Nonnegative matrix factorization based on alternating non-negativity-constrained least squares and the active set method, SIAM Journal on Matrix Analysis and Applications 30(2):713-730, 2008) (expressly incorporated herein by reference in its entirety for all purposes), or
- projected gradient method (Lin, C.-J., Projected Gradient Methods for Nonnegative Matrix Factorization, Neural Comp. 19(101:2756-2779, 2007) (expressly incorporated herein by reference in its entirety for all purposes).

Now, suppose there is a small variation on X so that X becomes:

$$\tilde{X} = X + \Delta X \quad (2)$$

and $\tilde{X} \in \mathbb{R}^{N \times d}$ is also nonnegative. It is desired to factorize $\tilde{X}$ into the product of two nonnegative matrices, $\tilde{F} \in \mathbb{R}^{n \times k}$ and $\tilde{G} \in \mathbb{R}^{d \times k}$; then it is necessary to solve the following optimization problem:

$$\min_{\tilde{F} \geq 0, \tilde{G} \geq 0} \|\tilde{X} - \tilde{F}\tilde{G}^T\|_F^2 \quad (3)$$

Assume $\|\Delta X\|_F^2$ is very small, and $\tilde{F}, \tilde{G}$ can be represented as:

$$\tilde{F} = F + \Delta F \quad (4)$$

$$\tilde{G} = G + \Delta G \quad (5)$$

Bringing Eq. (4) and Eq. (5) into problem (3), obtain:

$$\|\tilde{X} - \tilde{F}\tilde{G}^T\|_F^2 = \|X + \Delta X - (F + \Delta F)(G + \Delta G)^T\|_F^2 = \quad (6)$$
$$\|X + \Delta X - FG^T - \Delta FG^T - F\Delta G^T - \Delta F\Delta G^T\|_F^2$$

with the constraint that:

$$\tilde{F} = F + \Delta F \geq 0 \quad (7)$$

$$\tilde{G} = G + \Delta G \geq 0 \quad (8)$$

For the matrix Frobenius norm, there is the following triangle inequality:

$$\|X + \Delta X - FG^T - \Delta FG^T - F\Delta G^T - \Delta F\Delta G^T\|_F \geq \|X - FG^T\|_F + \|\Delta X - \Delta FG^T - F\Delta G^T - \Delta F\Delta G^T\|_F \quad (8A)$$

In an evolutionary setting according to one or more embodiments, the optimal F and G have already been obtained by solving problem (1); thus, $\|X - FG^T\|_F$ is already minimized, in order to minimize the objective of problem (3), one or more embodiments solve the following optimization problem:

$$\min_{\Delta F, \Delta G} \|\Delta X - \Delta FG^T - F\Delta G^T - \Delta F\Delta G^T\|_F^2 \quad (9)$$

$$\text{s.t. } F + \Delta F \geq 0, G + \Delta G \geq 0$$

This is an optimization problem with box constraints, and one or more embodiments apply the aforementioned Projected Gradient (PG) (Lin 2007) method to solve it.

Projected Gradient

An example of how to make use of PG to solve problem (9) will now be provided. For notational convenience, introduce a box projection operator $P_B[A]$ as:

$$(P_B[A])_{ij} = \begin{cases} A_{ij} & \text{if } A_{ij} \geq B_{ij} \\ B_{ij} & \text{otherwise} \end{cases} \quad (10)$$

Please refer to the pseudo-code for Technique 1—Projected Gradient as presented in FIG. 1. The PG method for solving the problem:

$$\min_{A \geq B} f(A) \quad (11)$$

can be presented in Technique 1, $\langle \cdot, \cdot \rangle$ where is the sum of elementwise multiplication, and the rule for determining the step size in Technique 1 is usually referred to as the Armijo rule (Bertsekas, D. P., Nonlinear Programming, Athena Scientific, 2nd edition, 1999) (expressly incorporated herein by reference in its entirety for all purposes).

Now consider again problem (9). Denote the objective of the above problem by:

$$\mathcal{J} = \|\Delta X - \Delta FG^T - F\Delta G^T - \Delta F\Delta G^T\|_F^2 \quad (13)$$

Then, the gradients of $\mathcal{J}$ with respect to $\Delta F$ and $\Delta G$ are:

$$\frac{\partial \mathcal{J}}{\partial \Delta F} = -2(\Delta X - \Delta FG^T - F\Delta G^T - \Delta F\Delta G^T)(G + \Delta G) \quad (14)$$

$$\frac{\partial \mathcal{J}}{\partial \Delta G} = -2(\Delta X - \Delta FG^T - F\Delta G^T - \Delta F\Delta G^T)^T(F + \Delta F) \quad (15)$$

Observe that there are two variables, $\Delta F$ and $\Delta G$, in problem (9). It is not easy, to solve for $\Delta F$ and $\Delta G$ simultaneously. However, if one variable is fixed, then the problem is convex with respect to the other. Therefore the block coordinate descent scheme (Bertsekas, Nonlinear Programming, supra), which is an alternating optimization strategy, can be employed for solution. At each round of the iteration, fix one variable and solve the other (via PG), until some stopping criterion is satisfied. As the objective is lower bounded by zero and after each round its value will decrease, the technique is guaranteed to converge. See Technique 2—eNMF pseudo-code in FIG. 2.

Complexity Analysis

For Technique 2, F, G and $\Delta F$, $\Delta G$ need to be held in the main memory; thus, the total storage complexity is $O(2k(n+d))$. We have usually found in our experiments that the obtained $\Delta F$ or $\Delta G$ is sparse; therefore the storage cost can be further reduced by only storing the nonzero elements.

For computational complexity, as both eNMF and NMF need to evaluate the function objective value (in the Armijo rule) when applying PG, one significant difference lies in the evaluation of the function gradient. Suppose that there are m and $\hat{m}$ non zero elements in the matrices $X+\Delta X$ and $\Delta X$ respectively, then, the time cost for Eq. (14) and Eq. (15) is:

$$O(\hat{m}k)+O(nk^2)+O(dk^2).$$

In contrast, the time complexity for computing the gradient for the original NMF is:

$$O(mk)+O(nk^2)+O(dk^2).$$

In many real applications, the matrix $\Delta X$ is usually much sparser than the matrix $X+\Delta X$ (i.e., $\hat{m}<<m$). Moreover, since:

$$k<<n, l<m,$$

$O(mk)$ is the dominant term of the time complexity for the original NMF. Therefore, it would be expected that the exemplary technique according to an aspect of the invention is significantly more efficient in computation compared with the original NMF.

Evolutionary Symmetric NMF

Another interesting scenario is *Symmetric NMF* (Wang, F.; Li, T.; Wang, X.; Zhu, S.; and Ding, C., Community discovery using nonnegative matrix factorization, Data Mining and Knowledge Discovery, 2010), where there is a symmetric square nonnegative feature matrix $S \in \mathbb{R}^{n \times n}$ (e.g., the connectivity matrix of an undirected graph). The goal to is factorize into the product of a nonnegative matrix $G \in \mathbb{R}^{n \times k}$ (usually k<<n) and its transpose by solving the following optimization problem:

$$\min_{G \geq 0} \|S - GG^\top\|_F^2 \quad (16)$$

The just-mentioned reference by Wang et al. derived a multiplicative update approach to solve problem (16). Actually, as problem (16) is also a minimization problem with box constraint, it is also possible to apply PG to solve it. Specifically, denote the objective of the above problem as:

$$\mathcal{J}_S = \|S - GG^T\|_F^2 \quad (17)$$

Then, solve it by PG using Technique 1 with $A=G$, $f(A)=\mathcal{J}_S$, $B=O$ ($O \in \mathbb{R}^{n \times k}$ is an all-zero matrix), and the gradient:

$$\nabla f(A) = \frac{\partial \mathcal{J}_S}{\partial G} = -4(S - GG^\top)G \quad (18)$$

In the evolutionary setting, S is changed to $\tilde{S}=S+\Delta S$ with a small $\|\Delta S\|_F^2$. Then, factorize $\tilde{S}$ by solving the following optimization problem:

$$\min_{\tilde{G} \geq 0} \|\tilde{S} - \tilde{G}\tilde{G}^\top\|_F^2 \quad (19)$$

Assume that $\tilde{G}$ takes the following form:

$$\tilde{G}=G+\Delta G \quad (20)$$

with a small $\|\Delta G\|_F^2$, Bringing Eq. (20) into the objective of problem (obtain:

$$\|\tilde{S}-\tilde{G}\tilde{G}^T\|_F = \|S+\Delta S-(G+\Delta G)(G+\Delta G^T)\|_F \leq \|S-GG^T\|_F + \|\Delta S-G\Delta G^T-\Delta GG^T-\Delta G\Delta G^T\|_F \quad (21)$$

Similarly to the asymmetric case, also minimize the upper bound instead of the original objective in problem (19). As $\|S-GG^T\|_F^2$ is already minimized, solve the following optimization problem instead for evolutionary SNMF:

$$\min_{\Delta G} \|\Delta S - G\Delta G^\top - \Delta GG^T - \Delta G\Delta G^\top\|_F^2 \quad (22)$$

$$\text{s.t. } G + \Delta G \geq 0$$

This problem is still a minimization problem with box constraints, which can be solved by PG, Denote the objective of the above problem by:

$$\mathcal{J}_S^e(\Delta G)=\|\Delta S-G\Delta G^T-\Delta GG^T-\Delta G\Delta G^T\|_F^2 \quad (23)$$

Then, problem (12 can be solved using PG in Technique 1 with: $A=\Delta G$, $f(A)=\mathcal{J}_S^e$, $B=-G$, and the gradient:

$$\frac{\partial \mathcal{J}_S^e}{\partial \Delta G} = -4(\Delta S - G\Delta G^\top - \Delta GG^T - \Delta G\Delta G^\top)(G + \Delta G) \quad (24)$$

The procedure of eSNMF is summarized in the pseudo-code of Technique 3—eSNMF in FIG. 3.

Suppose there are m and $\hat{m}$ non-zero elements in the matrices $S+\Delta S$ and $\Delta S$ respectively; then, the time cost for eq. (24) is $O(\hat{m}k)+O(nk^2)$. In contrast, the time complexity for computing the gradient for the original NMF is $O(mk)+O(nk^2)$. In many real, applications, the matrix $\Delta S$ is usually much sparser than the matrix $S+\Delta S$ (i.e., $\hat{m}<<m$). Moreover, since $k<<n$, l<m, $O(mk)$ dominates the time complexity for the original SNMF. Thus, one or more embodiments of the exemplary technique are believed to be computationally more efficient compared with the original SNMF.

Experiments

Experiments were conducted to evaluate the exemplary techniques with respect the following three aspects:
1. Convergency. How does the overall reconstruction error change with respect to the iteration steps?
2. Effectiveness. How effective are the exemplary techniques, compared with the original NMF and SNMF, respectively?
3. 3 Speed. How fast are the exemplary techniques?

It is to be emphasized that the presentation of experimental data is to convey to the skilled artisan results that may be obtained in some cases, and is not intended to limit the scope of the invention or imply that all embodiments will necessarily achieve similar results.

The data set used for evaluation is from DBLP at the University of Trier in Germany. Time-evolving matrices were constructed using the publication records from one of the following four conferences: AAAI, KDD, SIGIR, and NIPS. For each conference, the author-paper and the co-authorship snapshot matrices were first constructed from each of its publication years. The author-paper snapshot matrices are asymmetric; the rows are the authors and the columns are the papers. If a given author wrote a paper, the corresponding element in the matrix is 1 (and 0 otherwise). The first 6 snapshot matrices were aggregated as the initial X matrix, and each of the remaining snapshot matrices were treated as the $\Delta X$ matrix in Technique 2. Denote these four asymmetric time-evolving matrices as AAAI-AP, KDD-AP, SIGIR-AP, and NIPS-AP respectively; the same are summarized in the table of FIG. 4. Each of these four asymmetric time-evolving matrices typically contains a few thousands of rows and columns (n×d), and a few thousands of non-zero elements (m) in X, a few (T) $\Delta X$ matrices, and a few hundreds of non-zero elements ($\hat{m}$) in the $\Delta X$ matrix, on average.

The co-authorship snapshot matrices are symmetric, where each row/column corresponds to an author and edge weights are the number of co-authored papers. The first 6 snapshot matrices were also aggregated as the initial S matrix, and each of the remaining snapshot matrices were treated as the $\Delta S$ matrix in Technique 3. Denote these four symmetric time-evolving matrices as AAAI-AA, KDD-AA, SIGIR-AA, and NIPS-AA respectively, as summarized in the table of FIG. 4. Each of these four symmetric time-evolving matrices typically contains a few thousands of rows/columns (n×n), and a few thousand, or a few tens of thousands, of non-zeros elements (in) in the initial S matrix, a few (T) $\Delta S$ matrices, and a few thousands of non-zero elements ($\hat{m}$) in the $\Delta S$ matrix, on average.

Figure 6:
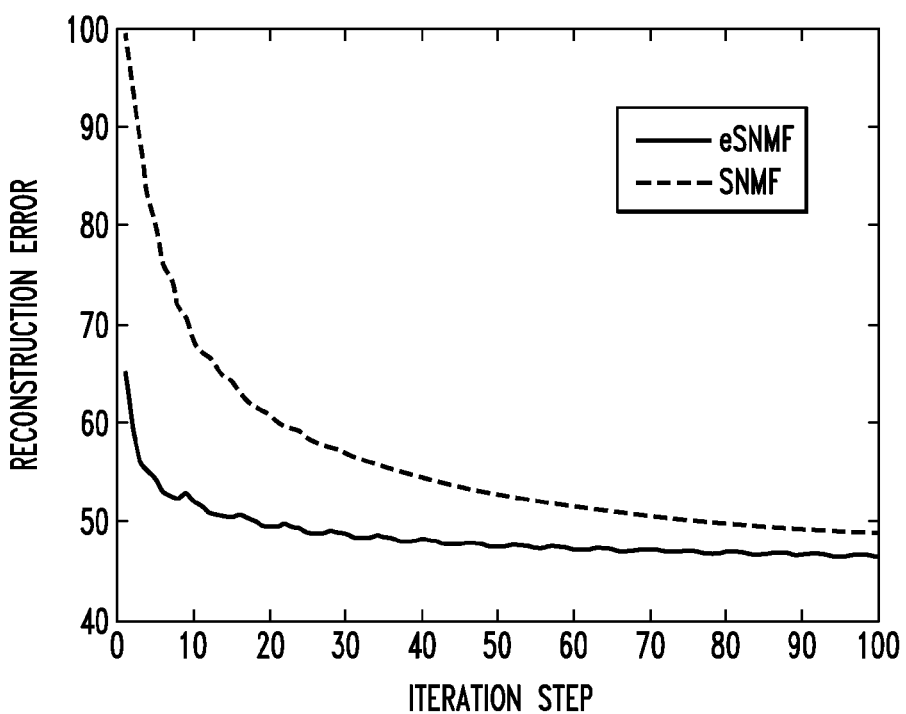
FIG. 6 shows reconstruction error versus iteration steps, on NIPS-AA data, using eSNMF.
Figure 7A:
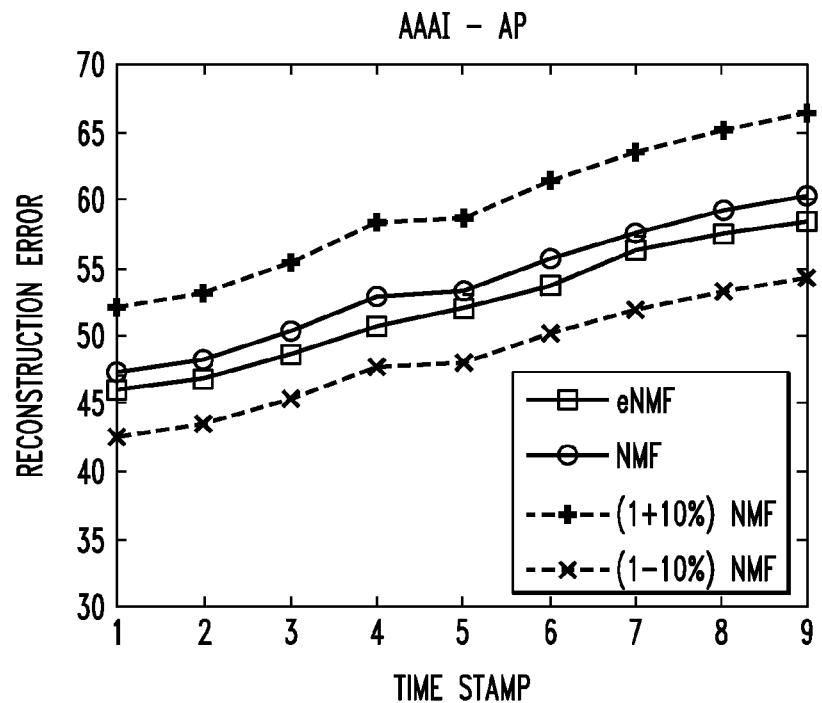
FIGS. 7A-7D show, respectively, a comparison for asymmetric matrices for AAAI-AP, KDD-AP, SIGIR-AP, and NIPS-AP, wherein the x-axis is a time stamp and the y-axis is thee final reconstruction error, all for eNMF.
Figure 7B:
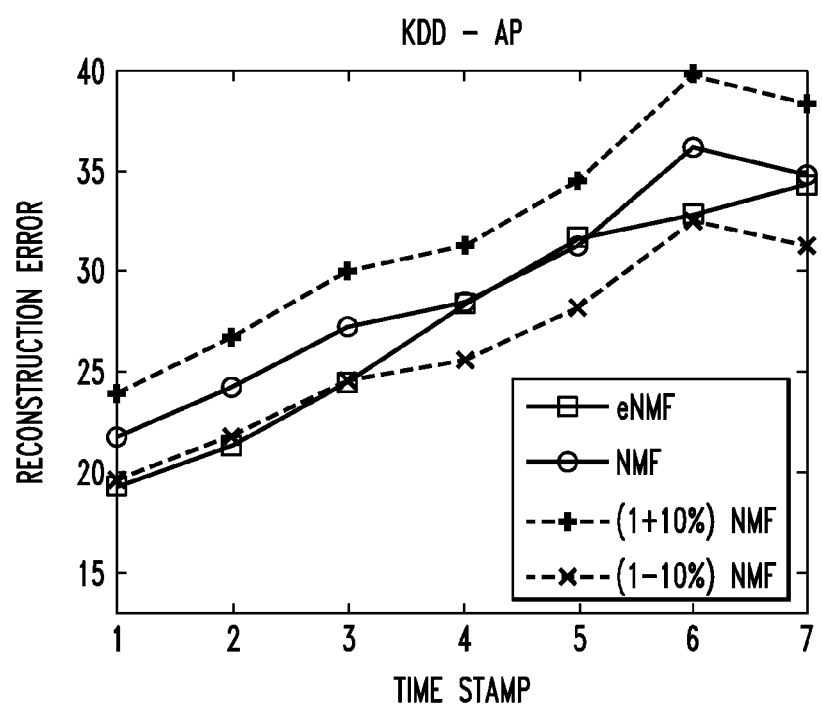
Figure 7C:
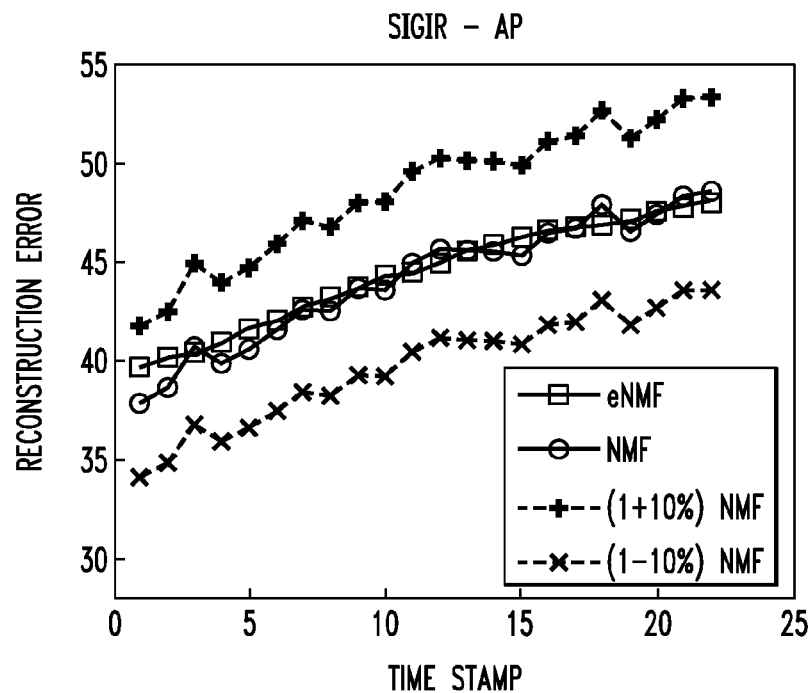
Figure 7D:
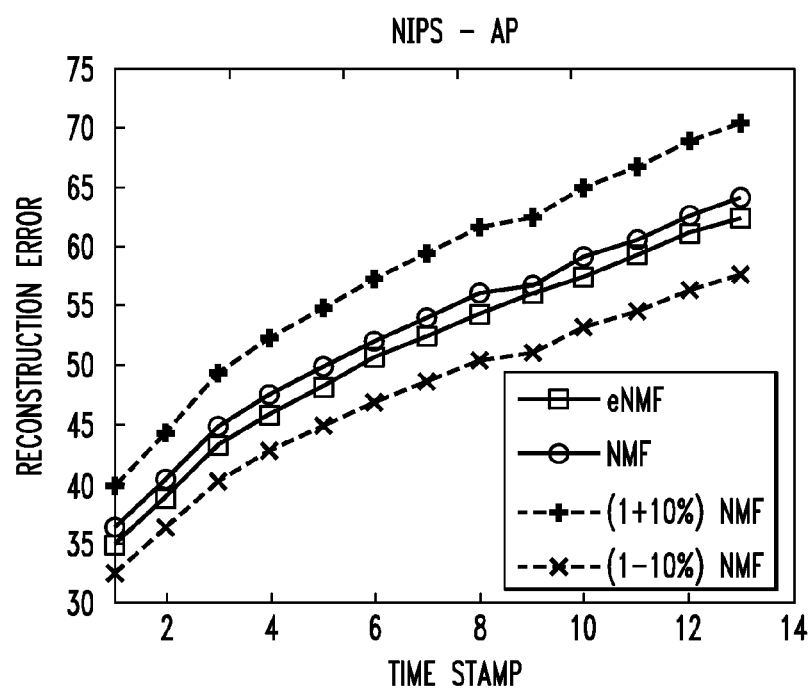
Figure 8A:
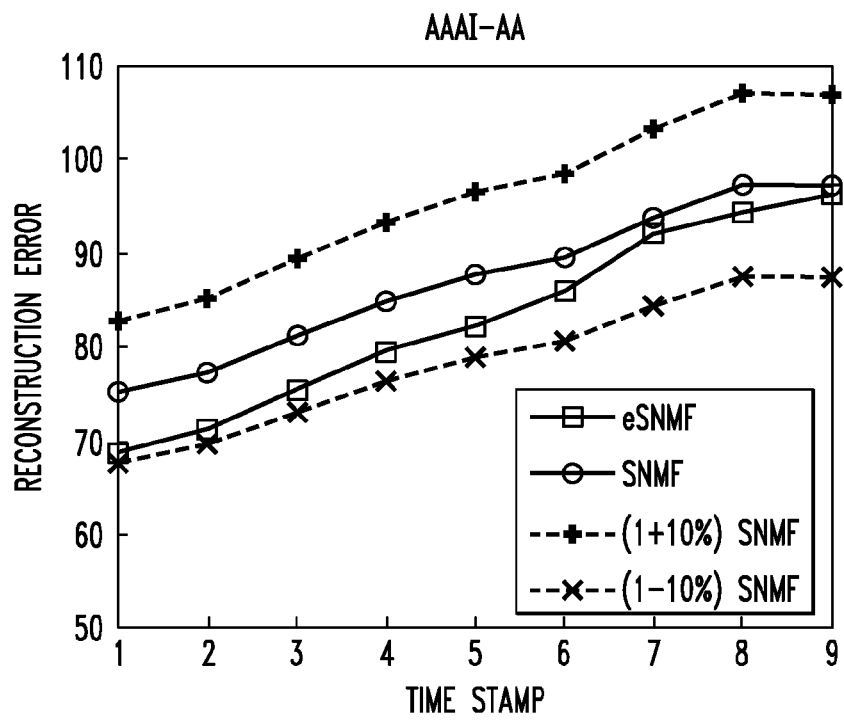
FIGS. 8A-8D show, respectively, a comparison for symmetric matrices for AAAI-AA, KDD-AA, SIGIR-AA, and NIPS-AA, wherein the x-axis is a time stamp and the y-axis is the final reconstruction error, all for eSNMF.
Figure 8B:
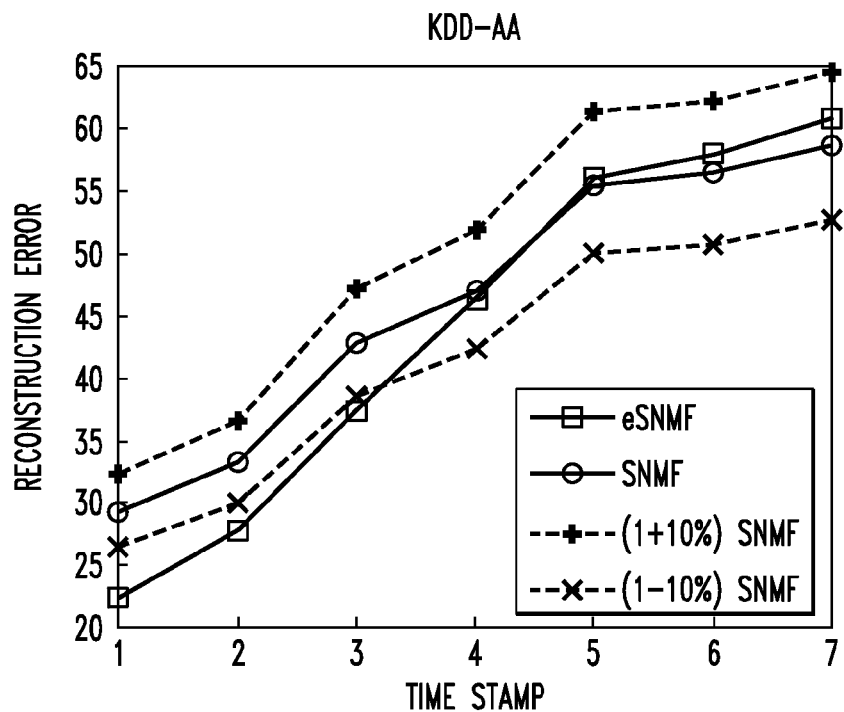
Figure 8C:
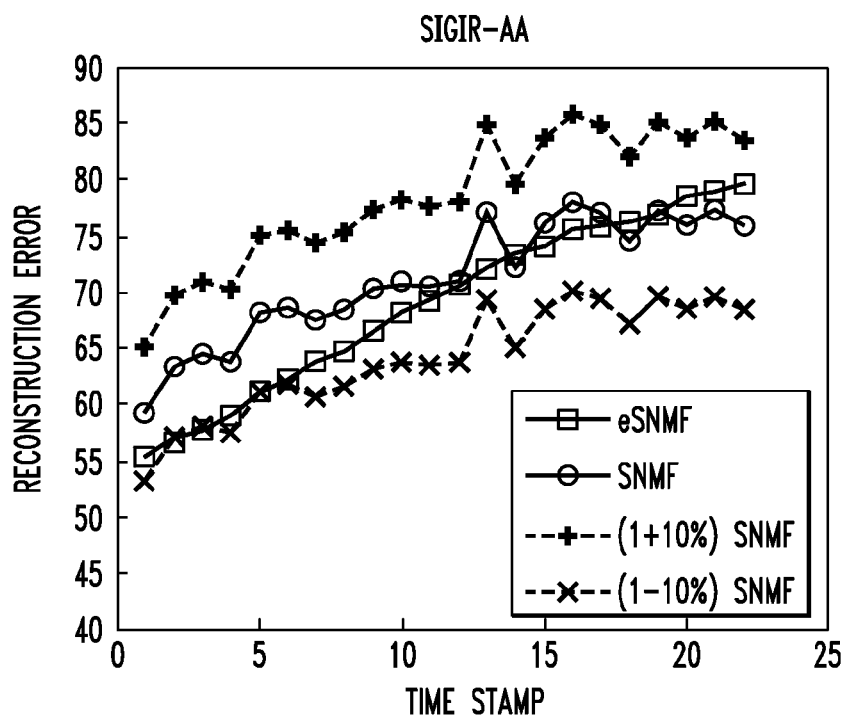
Figure 8D:
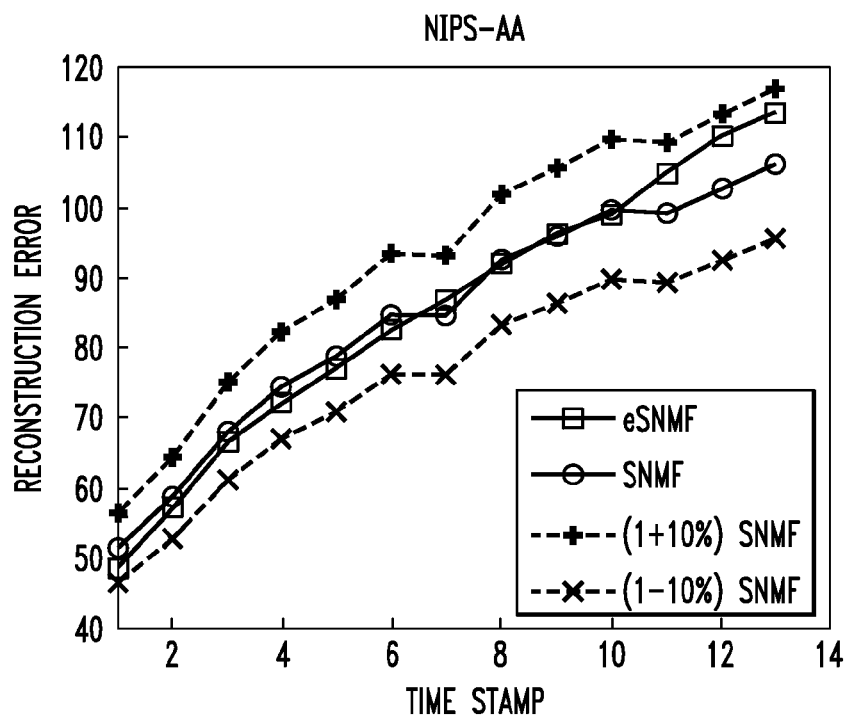

Convergence:

In both eNMF and eSNMF, instead of minimizing the true reconstruction error directly, an attempt is made to minimize its upper bound. Here, what is tested is how the true reconstruction error changes with respect to the iteration steps. FIGS. 5 and 6 show the results on NIPS-AP and NIPS-AA for one time stamp, respectively. Techniques in accordance with aspects of the invention are compared with the original NMF and SNMF respectively. From the figures, it can be seen that for both eNMF and eSNMF, the overall reconstruction error decreases quickly and reaches a steady state with respect to the iteration steps, suggesting that techniques in accordance with aspects of the invention indeed converge fast. It is worth pointing out that the final reconstruction error of eNMF is very close to that of the original NMF. Similar observations can be made for eSNMF and SNMF.

In particular, FIG. 5 shows the reconstruction error vs. iteration steps on NIPS-AA data. The eNMF technique converges quickly, leading to a similar reconstruction error as NMF after convergence. Further, FIG. 6 shows the reconstruction error vs. iteration steps on NIPS-AA data. The eSNMF technique converges quickly, leading to a similar reconstruction error as SNMF after convergence.

Effectiveness Comparison:

Here, evaluate the effectiveness of eNMF and eSNMF in terms of the final reconstruction error (i.e., the reconstruction error after the techniques converge). For each time stamp of a given data set, run eNMF (or eSNMF for the symmetric matrix) and NMF (or SNMF for the symmetric matrix) until convergence, and then compare the reconstruction errors. The results are summarized in FIGS. 7A-7D and 8A-8D. It can be seen that in terms of the final reconstruction error, techniques in accordance with one or more aspects of the invention are very close to the original methods (NMF and SNMF). In most cases, the final reconstruction error of eNMF and eSNMF is within the range of 1+/−10% of that by the original NMF and SNMF respectively. For those exceptions (e.g., KDD-AP, KDD-AA, SIGIR-AA), techniques in accordance with one or more aspects of the invention actually lead to smaller reconstruction error. On the other hand, techniques in accordance with one or more aspects of the invention do not require the original X and S matrices, which in turn leads to some nice properties for the applications (e.g., space and computation efficiency, privacy-friendly, and the like).

In particular, FIGS. 7A-7D present a comparison for asymmetric matrices. The x-axis is time stamp (each corresponds to a publication year), and the y-axis is the final reconstruction error. The reconstruction error of the eNMF technique is very close to that of the original NMF. Further, FIGS. 8A-8D present a comparison for symmetric matrices. The x-axis is time stamp (each corresponds to a publication year), and the y-axis is the final reconstruction error. The reconstruction error of the eSNMF technique is very close to that of the original SNMF.

Figure 9:
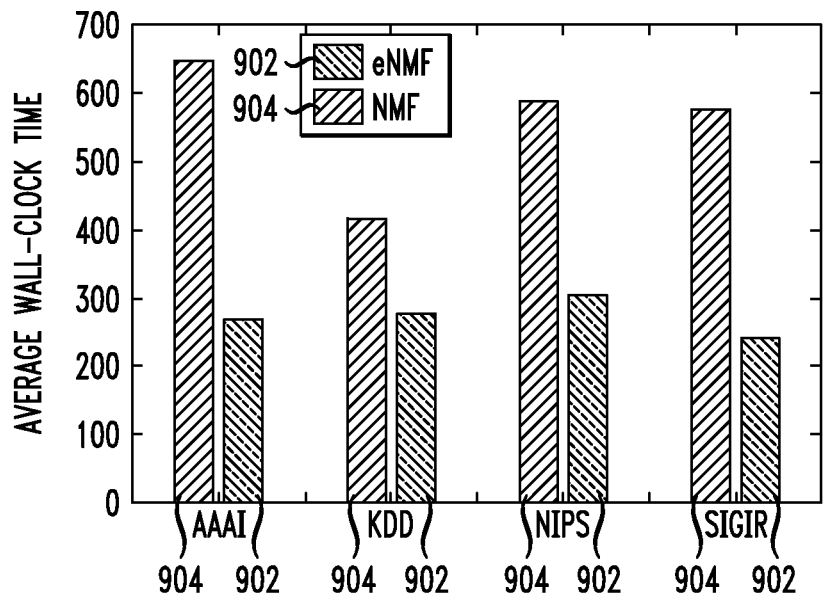
FIG. 9 is a speed comparison of eNMF and NMF.
Figure 10:
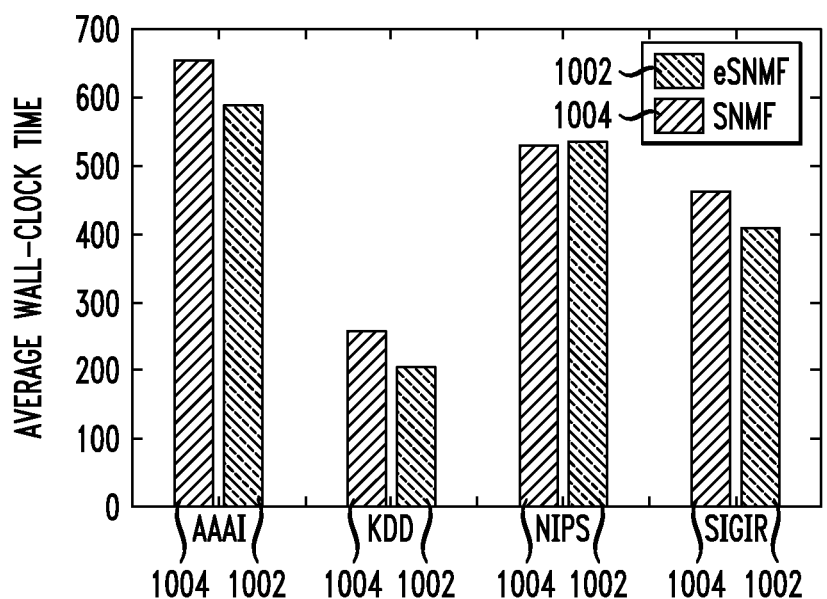
FIG. 10 is a speed comparison of eSNMF and SNMF.

Speed Comparison:

Speed was also compared between techniques in accordance with one or more aspects of the invention and the original NMF and SNMF, FIGS. 9 and 10 show the average wall-clock time on each data set. In FIG. 9, eNMF data is 902 and NMF data is 904. In FIG. 10, eSNMF data is 1002 and SNMF data is 1004. The results are consistent with the complexity analysis presented above. In most cases, eNMF and eSNMF are faster than the original NMF and SNMF respectively. The only exception is the NIPS-AA data set, where eSNMF is slightly slower than the original SNMF. This is because for this data set, there are more non-zero elements in the $\Delta S$ matrix ($\hat{m}$=6,860) than that of the original S matrix (m=6,063), on average. Compared with eNMF and eSNMF, it can be seen that the speed saving is more significant in eNMF. This is because the $\Delta X$ matrix is much sparser than the $\Delta S$ matrix; on average, there are a few hundred non-zero elements in $\Delta X$, and a few thousand non-zero elements in $\Delta S$.

One or more embodiments of the invention may be employed in a variety of scenarios. For example, in the field of social network analysis, given <people, people> email and/or other communication records over time, monitoring the communities of people over time. In the health care field, given <patient, visit and/or treatment> logs, automatically segment the patients. For cyber-security, given <people/LP, accessing> logs, automatically maintain the role of people/IP as well as the description of each role. In this context, IP refers to Internet Protocol address. In the field of commerce, given <customer, purchasing> logs over time, customers can be grouped for better advertising.

Challenges arise in one or more applications. For example, due consideration should be had to pertinent laws, rules, regulations, and ethical standards pertaining to privacy. Some partition of the data is sensitive, and it is impossible to directly access it; or it can be only accessed at certain time-window. Furthermore, many applications are dynamic in that both role membership and role description might change over time. In addition, efficiency in both running time and storage cost is a consideration. One or more embodiments advantageously de-couple the data dependency by minimizing and/or working on the upper-bound of the exact criteria so that it is not necessary to access, store or process the old sensitive data.

In this regard, in the above-mentioned triangle inequality, the term $\|X-FG^T\|_F$ is dependent on X but fixed, while the term $\|\Delta X - \Delta F G^T - F \Delta G^T - \Delta F \Delta G^T\|_F$ is independent of X.

Thus, in one or more embodiments, given a <user, activity>, or <user, user> log that changes over time, track the role and/or cluster of the users as well as the description of each role and/or cluster, such that:

(1) Access of the sensitive port on of the data is avoided to protect user privacy (privacy-aware);
(2) The storing and processing of the old data is avoided, to improve the space and time efficiency (time and space efficiency).

One or more embodiments thus address grouping of users, dynamic situations (e.g., dynamics of roles and/or groups), correlation among different users, privacy concerns, and/or finding and/or tracking of the user roles themselves. Furthermore, one or more embodiments can address batch and/or negative changes; group and/or cluster the users into different roles; find the description of roles of the users; track user role descriptions; and/or avoid access of past data (in particular, tracking a user's role without accessing past data). In addition, one or more embodiments can be applied to a general graph; employ matrix-based methods; do not require location information; monitor the collective behavior of a group of users; and/or take as input data a time-evolving graph.

One or more embodiments provide a method and system that tracks user roles from <user, activity, time> logs, including initializing the people-role membership, role-activity description based on old logs; inferring the change of people-role membership, without accessing old and/or sensitive portion(s) of the logs; inferring the change of role-activity description, without accessing old and/or sensitive portion(s) of the logs; and updating the new people-role membership, and role-activity description(s).

In some instances, the method infers the change of people-role membership, without accessing old and/or sensitive portion(s) of the logs, by calculating the interaction between the change of people-role membership and the old role-activity description(s); calculating the interaction between the old people-role membership and the change of role-activity description(s); calculating the interaction between the change of people-role membership and the change of role-activity description(s); inferring the strength of the change of people-role membership(s); and adjusting the strength of the change of people-role membership(s) to the feasible regions.

In some cases, the method infers the change of role-activity description, without accessing old and/or sensitive portion(s) of the logs, by calculating the interaction between the change of people-role membership and the old role-activity description; calculating the interaction between the old people-role membership and the change of role-activity description; calculating the interaction between the change of people-role membership and the change of role-activity description; inferring the strength of the change of role-activities description; and adjusting the strength of the change of role-activities description to the feasible regions.

One or more embodiments provide a method and system that tracks user roles from <user, user, time> logs, including initializing the people-role membership based on old logs; inferring the change of people-role membership, without accessing old and/or sensitive portion(s) of the logs; and updating the new people-role membership.

In some instances, the method that infers the change of people-role membership, without accessing old and/or sensitive portion(s) of the logs, includes calculating the interaction between the change of people-role membership and the old people-role membership; inferring the strength of the change of people-role membership; and adjusting the strength of the change of people-role membership to the feasible regions.

In one or more embodiments, given a user-activity log that changes over time, it is desired to monitor the role and/or cluster of the users as well as the description of each role and/or cluster in a privacy-aware manner. The design objective in one or more instances is two-fold, namely: (1) avoiding access of the sensitive portion of the data to protect user privacy; and (2) avoiding storing and processing of the old data to improve space and time efficiency. One or more embodiments provide a method and system that can efficiently track user-profiling over time without accessing the whole data sets. One or more embodiments advantageously consider the correlation among different users; and/or can be employed even when the data is not static.

Again, to reiterate, a significant aspect of one or more embodiments is as follows: instead of minimizing the original objective function, relax it and minimize its upper bound so that it is not necessary to access, store or process the old sensitive data. The advantage, in one or more cases, is two-fold:

(1) By decoupling the computation, it is not necessary to access the whole data set. Therefore, in the case that a certain portion of the data set is sensitive, users' privacy can be protected.
(2) Since it is not necessary to store or do computation on the whole data set, one or more embodiments are more efficient in terms of both storage and computation.

CONCLUSION AND RECAPITULATION

One or more embodiments thus provide an evolutionary Nonnegative Matrix Factorization (eNMF) strategy to efficiently perform NMF in the scenario where the data features are evolving over time. One or more embodiments are both storage and computationally efficient as well as privacy friendly. Non-limiting exemplary experimental results on real world time evolving networks are presented to demonstrate the effectiveness of one or more exemplary embodiments.

Figure 12:
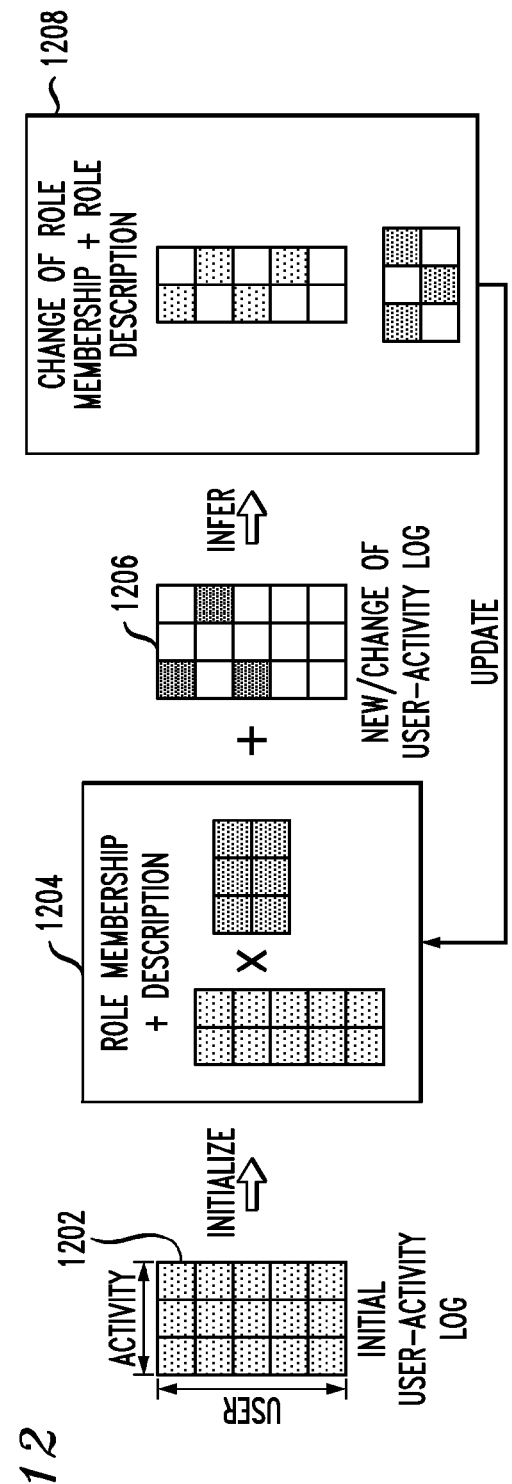
FIG. 12 is a combined flow chart and block diagram of the eNMF technique.

Given the discussion thus far, and with reference to FIGS. 2 and 12, it will be appreciated that, in general terms, an exemplary method for analyzing a set of data (in the form of a nonnegative asymmetric matrix 1202) which tracks time-stamped activities of a plurality of entities, according to an aspect of the invention, includes the step of obtaining access to a first nonnegative factor matrix $\Delta F^{(0)}$ and a second nonnegative factor matrix $\Delta G^{(0)}$ obtained by factorizing the nonnegative asymmetric matrix. The first nonnegative factor matrix is representative of initial role membership of the entities, and the second nonnegative factor matrix is representative of initial role activity descriptions (see block 1204 in FIG. 12). Refer to the initialization and ensuring steps of Technique 2—eNMF.

Referring to blocks 1206 and 1208 in FIG. 12, a further step includes, at a given one of the time stamps (given value of t), while holding a change in the first nonnegative factor matrix constant (at $\Delta F^{(t-1)}$), updating a change in the second nonnegative factor matrix ($\Delta G^{(t)}$), to reflect time variance of the set of data at the given one of the time stamps, without accessing actual data values at previous ones of the time stamps. A still further step includes at the given one of the time stamps, while holding a change in the second nonnegative factor matrix constant ($\Delta G^{(t)}$), updating a change in the first nonnegative factor matrix ($\Delta F^{(t)}$), to reflect the time variance of the set of data at the given one of the time stamps, without accessing the actual data values at the previous ones of the time stamps.

An even further step includes updating the role membership of the entities and the role activity descriptions, at the given one of the time stamps, based on the updating steps, as per the return arrow from block 1208 to block 1204 in FIG. 12.

In some instances, the steps of updating the change in the second nonnegative factor matrix and the change in the first nonnegative factor matrix include use of a projected gradient technique, such as Technique 1 in FIG. 1.

As noted above, and referring also to Equation (15), in some instances, the method infers the change of entity-role membership, without accessing old and/or sensitive portion(s) of the logs, by calculating the interaction between the change of entity-role membership and the old role-activity description(s) ($\Delta FG^T$ term); calculating the interaction between the old entity-role membership and the change of role-activity description(s) ($F\Delta G^T$ term); calculating the interaction between the change of entity-role membership and the change of role-activity description(s) ($\Delta F\Delta G^T$ term); inferring the strength of the change of entity-role membership(s) (using all the calculated terms to calculate $$\frac{\partial \mathcal{J}}{\partial \Delta G}$$

from Equation (15)); and adjusting the strength of the change of entity-role membership(s) to the feasible regions (by applying Technique 1 to the gradient calculated using Equation (15)).

As noted above, and referring also to Equation (14), in some cases, the method infers the change of role-activity description, without accessing old and/or sensitive portion(s) of the logs, by calculating the interaction between the change of entity-role membership and the old role-activity description ($\Delta FG^T$ term); calculating the interaction between the old entity-role membership and the change of role-activity description ($F\Delta G^T$ term); calculating the interaction between the change of entity-role membership and the change of role-activity description ($\Delta F\Delta G^T$ terra); inferring the strength of the change of role-activities description (using all the calculated terms to calculate $$\frac{\partial \mathcal{J}}{\partial \Delta F}$$

from Equation (14)); and adjusting the strength of the change of role-activities description to the feasible regions thy applying Technique 1 to the gradient calculated using Equation (14)).

In one or more embodiments, the steps of updating the change in the second nonnegative factor matrix and the change in the first nonnegative factor matrix, and the step of updating the role membership of the entities and the role activity descriptions, are repeated at a plurality of additional time stamps t.

As noted, in at least some instances, embodiments of the invention minimize an upper bound of an objective as opposed to an objective itself. Refer to the right side of the triangle inequality 8(A), which is the upper bound of the left-hand side, in connection with Technique 2.

Figure 14:
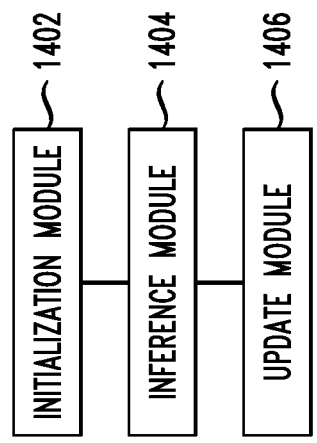
FIG. 14 is an exemplary software architecture diagram, according to an aspect of the invention.

FIG. 14 shows an exemplary block diagram, including an initialization module 1402, an inference module 1404, and an update module 1406, in one or more embodiments, the initialization module performs the step of obtaining access to the first nonnegative factor matrix $\Delta F^{(0)}$ and the second nonnegative factor matrix $\Delta G^{(0)}$ obtained by factorizing the nonnegative asymmetric matrix X. In one or more embodiments, the inference module performs the steps of updating the change in the second nonnegative factor matrix ($\Delta G^{(t)}$) and the change in the first nonnegative factor matrix ($\Delta F^{(t)}$). In one or more embodiments, the update module performs the step of updating the role membership of the entities and the role activity descriptions. The modules are preferably distinct software modules which implement the corresponding equations and/or inequalities in a high-level programming language which is compiled or interpreted to result in computer code stored in persistent storage and loadable into memory to cause one or more processors to implement the desired functionality.

Figure 13:
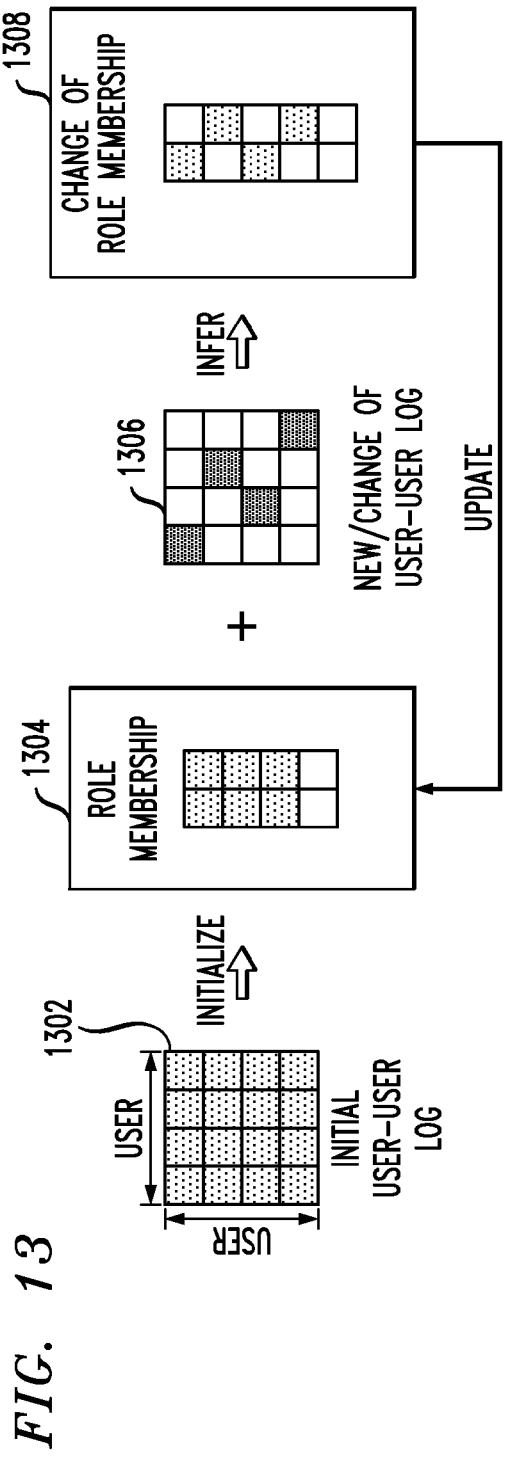
FIG. 13 is a combined flow chart and block diagram of the eSNMF technique.

Given the discussion thus far, and with reference to FIGS. 3 and 13, it will be appreciated that, in general terms, another exemplary method for analyzing a set of data (in the form of a nonnegative symmetric matrix 1302) which tracks time-stamped activities of a plurality of entities, according to another aspect of the invention, includes the step of obtaining access to a nonnegative factor matrix $\Delta G^{(0)}$, obtained by factorizing the nonnegative symmetric matrix S. The nonnegative factor matrix is representative of initial role membership of the entities, as indicated at 1304. Possession of a matrix inherently implies possession of its transpose as well. Referring to blocks 1306 and 1308, further steps include, at a given one of the time stamps k, updating a change in the nonnegative factor matrix $\Delta G^{(k)}$, to reflect time variance of the set of data at the given one of the time stamps, without accessing actual data values at previous ones of the time stamps; and updating the role membership of the entities, at the given one of the time stamps, based on the updating step (return arrow from block 1308 to block 1304).

In some instances, the step of updating the change in the nonnegative factor matrix includes use of a projected gradient technique, such as Technique 1 in FIG. 1.

As noted above, and referring also to Equation (24), in some cases, the method that infers the change of entity-role membership, without accessing old and/or sensitive portion(s) of the logs, includes calculating the interaction between the change of entity-role membership and the old entity-role membership ($G\Delta G^T$ term); inferring the strength of the change of entity-role member ship (using all the calculated terms to calculate $$\frac{\partial \mathcal{J}_S^\varepsilon}{\partial \Delta G}$$

from Equation (24)); and adjusting the strength of the change of entity-role membership to the feasible regions (by applying Technique 3 using the gradient calculated using Equation (24)).

In one or more embodiments, the step of updating the change in the nonnegative factor matrix and the step of updating the role membership of the entities, are repeated at a plurality of additional time stamps k.

As noted, in at least some instances, embodiments of the invention minimize an upper bound of an objective as opposed to an objective itself. Refer to the right hand side of the triangle inequality (21), which is the upper bound of the left-hand side, in connection with Technique 3.

The exemplary block diagram of FIG. 14 is also indicative of a suitable software architecture for implementing Technique 3. Of course, the actual code it each module will be different depending on the technique being performed. In one or more embodiments, the initialization module performs the step of obtaining access to the nonnegative factor matrix $\Delta G^{(o)}$, obtained by factorizing the nonnegative symmetric matrix S. In one or more embodiments, the inference module performs the step of updating a change in the nonnegative factor matrix $\Delta G^{(k)}$. In one or more embodiments, the update module performs the step of updating the role membership of the entities.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof can be implemented in the form of an apparatus including a memory and at least one processor that is coupled to the memory and operative to perform exemplary method steps.

Figure 11:
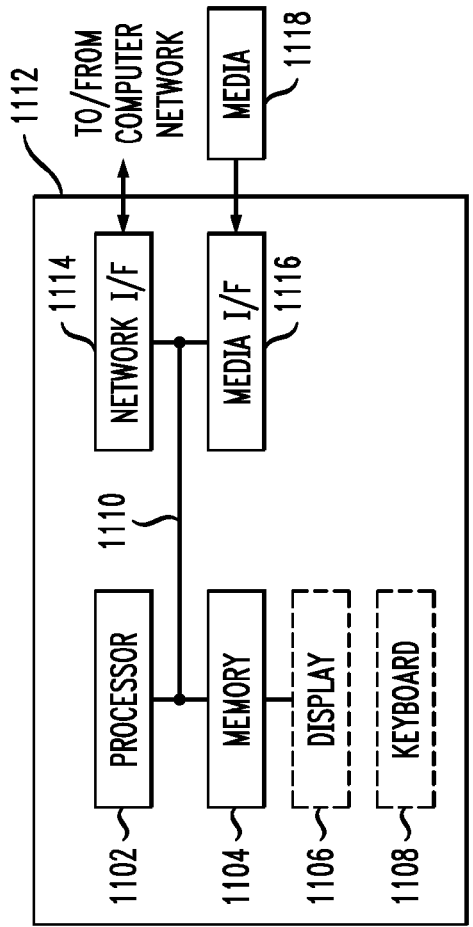
FIG. 11 depicts a computer system that may be useful in implementing one or more aspects and/or elements of the invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RE etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, an initialization module, an inference module, and an update module. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the an without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for analyzing a set of data which tracks time-stamped activities of a plurality of entities, said set of data comprising a nonnegative asymmetric matrix, said method comprising:

obtaining access to a first nonnegative factor matrix and a second nonnegative factor matrix obtained by factorizing said nonnegative asymmetric matrix, said first nonnegative factor matrix being representative of initial role membership of said entities, said second nonnegative factor matrix being representative of initial role activity descriptions;

at a given one of said time stamps, while holding a change in said first nonnegative factor matrix constant, updating a change in said second nonnegative factor matrix, to reflect time variance of said set of data at said given one of said time stamps, without accessing actual data values at previous ones of said time stamps, said actual data values at said previous ones of said time stamps being privacy-sensitive;

at said given one of said time stamps, while holding a change in said second nonnegative factor matrix constant, updating a change in said first nonnegative factor matrix, to reflect said time variance of said set of data at said given one of said time stamps, without accessing said actual data values at said previous ones of said time stamps, said actual data values at said previous ones of said time stamps being privacy-sensitive;

updating said role membership of said entities and said role activity descriptions, at said given one of said time stamps, based on said updating steps; and providing a system, wherein the system comprises distinct software modules, each of the distinct software modules being embodied on a non-transitory computer-readable storage medium, and wherein the distinct software modules comprise an initialization module, an inference module, and an update module;

wherein:

said obtaining step is carried out by said initialization module executing on at least one hardware processor;

said updating of said change in said second nonnegative factor matrix and said updating of said change in said first nonnegative factor matrix are carried out by said inference module executing on said at least one hardware processor; and said updating of said role membership of said entities and said role activity descriptions is carried out by said update module executing on said at least one hardware processor.

2. The method of claim 1, wherein said steps of updating said change in said second nonnegative factor matrix and said change in said first nonnegative factor matrix comprise use of a projected gradient technique.

3. The method of claim 2, wherein said updating of said change in said second nonnegative factor matrix comprises:
calculating interaction between a change of entity-role membership and an old role-activity description;
calculating an interaction between an old entity-role membership and a change of role-activity description;
calculating an interaction between said change of entity-role membership and said change of role-activity description;
inferring strength of said change of role-activities description; and
adjusting said strength of said change of role-activities description to feasible regions.

4. The method of claim 3, wherein said updating of said change in said first nonnegative factor matrix comprises:
calculating said interaction between said change of entity-role membership and said old role-activity description;
calculating said interaction between said old entity-role membership and said change of role-activity description;
calculating an interaction between said change of entity-role membership and said change of role-activity description;
inferring strength of said change of entity-role membership; and
adjusting said strength of said change of entity-role membership to feasible regions.

5. The method of claim 2, further comprising repeating said steps of updating said change in said second nonnegative factor matrix and said change in said first nonnegative factor matrix, and said step of updating said role membership of said entities and said role activity descriptions, at a plurality of additional ones of said time stamps.

6. A method for analyzing a set of data which tracks time-stamped activities of a plurality of entities, said set of data comprising a nonnegative symmetric matrix, said method comprising:

obtaining access to a nonnegative factor matrix, obtained by factorizing said nonnegative symmetric matrix, said nonnegative factor matrix being representative of initial role membership of said entities;

at a given one of said time stamps, updating a change in said nonnegative factor matrix, to reflect time variance of said set of data at said given one of said time stamps, without accessing actual data values at previous ones of said time stamps, said actual data values at said previous ones of said time stamps being privacy-sensitive;

updating said role membership of said entities, at said given one of said time stamps, based on said updating step; and providing a system, wherein the system comprises distinct software modules, each of the distinct software modules being embodied on a non-transitory computer-readable storage medium, and wherein the distinct software modules comprise an initialization module, an inference module, and an update module;

wherein:

said obtaining step is carried out by said initialization module executing on at least one hardware processor;

said updating of said change in said nonnegative factor matrix is carried out by said inference module executing on said at least one hardware processor; and said updating of said role membership of said entities is carried out by said update module executing on said at least one hardware processor.

7. The method of claim 6, wherein said step of updating said change in said nonnegative factor matrix comprises use of a projected gradient technique.

8. The method of claim 7, wherein said updating of said change in said nonnegative factor matrix comprises:
calculating interaction between a change of entity-role membership and an old entity-role membership;
inferring strength of the change of entity-role membership; and
adjusting said strength of said change of entity-role membership to feasible regions.

9. The method of claim 7, further comprising repeating said step of updating said change in said nonnegative factor matrix and said step of updating said role membership of said entities at a plurality of additional ones of said time stamps.

10. An article of manufacture comprising a computer program product for analyzing a set of data which tracks time-stamped activities of a plurality of entities, said set of data comprising a nonnegative asymmetric matrix, said computer program product comprising:

a non-transitory tangible computer-readable storage medium, storing in a non-transitory manner computer readable program code, the computer readable program code comprising:

computer readable program code configured to, when executed on at least one hardware processor, cause said at least one hardware processor to obtain access to a first nonnegative factor matrix and a second nonnegative factor matrix obtained by factorizing said nonnegative asymmetric matrix, said first nonnegative factor matrix being representative of initial role membership of said entities, said second nonnegative factor matrix being representative of initial role activity descriptions;

computer readable program code configured to, when executed on said at least one hardware processor, cause said at least one hardware processor to, at a given one of said time stamps, while holding a change in said first nonnegative factor matrix constant, update a change in said second nonnegative factor matrix, to reflect time variance of said set of data at said given one of said time stamps, without accessing actual data values at previous ones of said time stamps, said actual data values at said previous ones of said time stamps being privacy-sensitive;

computer readable program code configured to, when executed on said at least one hardware processor, cause said at least one hardware processor to, at said given one of said time stamps, while holding a change in said second nonnegative factor matrix constant, update a change in said first nonnegative factor matrix, to reflect said time variance of said set of data at said given one of said time stamps, without accessing said actual data values at said previous ones of said time stamps, said actual data values at said previous ones of said time stamps being privacy-sensitive; and computer readable program code configured to, when executed on said at least one hardware processor, cause said at least one hardware processor to update said role membership of said entities and said role activity descriptions, at said given one of said time stamps, based on said updating of said changes in said first and second nonnegative factor matrices;

wherein the computer readable program code comprises distinct software modules, each of the distinct software modules being embodied on said non-transitory tangible computer-readable storage medium, and wherein the distinct software modules comprise an initialization module, an inference module, and an update module; wherein:

said initialization module comprises said computer readable program code configured to obtain access said inference module comprises said computer readable program code configured to update said change in said second nonnegative factor matrix and to update said change in said first nonnegative factor matrix; and said update module comprises said computer readable program code configured to update said role membership of said entities and said role activity descriptions.

11. The article of manufacture of claim 10, wherein said computer readable program code configured to update said change in said second nonnegative factor matrix and said change in said first nonnegative factor matrix comprises computer readable program code configured to use a projected gradient technique.

12. The article of manufacture of claim 11, wherein said computer readable program code configured to update said change in said second nonnegative factor matrix comprises:

computer readable program code configured to calculate interaction between a change of entity-role membership and an old role-activity description;

computer readable program code configured to calculate interaction between an old entity-role membership and a change of role-activity description;

computer readable program code configured to calculate interaction between said change of entity-role membership and said change of role-activity description;

computer readable program code configured to infer strength of said change of role-activities description; and computer readable program code configured to adjust said strength of said change of role-activities description to feasible regions.

13. The article of manufacture of claim 12, wherein said computer readable program code configured to update said change in said first nonnegative factor matrix comprises:

computer readable program code configured to calculate said interaction between said change of entity-role membership and said old role-activity description;

computer readable program code configured to calculate said interaction between said old entity-role membership and said change of role-activity description;

computer readable program code configured to calculate an interaction between said change of entity-role membership and said change of role-activity description;

computer readable program code configured to infer strength of said change of entity-role membership; and computer readable program code configured to adjust said strength of said change of entity-role membership to feasible regions.

14. The article of manufacture of claim 11, further comprising computer readable program code configured to repeat:

said updating of said change in said second nonnegative factor matrix and said updating of said change in said first nonnegative factor matrix, and said updating said role membership of said entities and said role activity descriptions, at a plurality of additional ones of said time stamps.

15. An article of manufacture comprising a computer program product for analyzing a set of data which tracks timestamped activities of a plurality of entities, said set of data comprising a nonnegative symmetric matrix, said computer program product comprising:

a non-transitory tangible computer-readable storage medium, storing in a non-transitory manner computer readable program code, the computer readable program code comprising:

computer readable program code configured to, when executed on at least one hardware processor, cause said at least one hardware processor to obtain access to a nonnegative factor matrix, obtained by factorizing said nonnegative symmetric matrix, said nonnegative factor matrix being representative of initial role membership of said entities;

computer readable program code configured to, when executed on at least one hardware processor, cause said at least one hardware processor to, at a given one of said time stamps, update a change in said nonnegative factor matrix, to reflect time variance of said set of data at said given one of said time stamps, without accessing actual data values at previous ones of said time stamps, said actual data values at said previous ones of said time stamps being privacy-sensitive; and computer readable program code configured to, when executed on at least one hardware processor, cause said at least one hardware processor to update said role membership of said entities, at said given one of said time stamps, based on said updating of said change in said nonnegative factor matrix;

wherein the computer readable program code comprises distinct software modules, each of the distinct software modules being embodied on said non-transitory tangible computer-readable storage medium, and wherein the distinct software modules comprise an initialization module, an inference module, and an update module;

wherein:

said initialization module comprises said computer readable program code configured to obtain access said inference module comprises said computer readable program code configured to update said change in said nonnegative factor matrix; and said update module comprises said computer readable program code configured to update said role membership of said entities.

16. The article of manufacture of claim 15, wherein said step of updating said change in said nonnegative factor matrix comprises use of a projected gradient technique.

17. The article of manufacture of claim 16, wherein said computer readable program code configured to update said change in said nonnegative factor matrix comprises:

computer readable program code configured to calculate interaction between a change of entity-role membership and an old entity-role membership;

computer readable program code configured to infer strength of the change of entity-role membership; and computer readable program code configured to adjust said strength of said change of entity-role membership to feasible regions.

18. The article of manufacture of claim 16, further comprising computer readable program code configured to repeat said updating of said change in said nonnegative factor matrix and said updating of said role membership of said entities at a plurality of additional ones of said time stamps.

19. An apparatus for analyzing a set of data which tracks time-stamped activities of a plurality of entities, said set of data comprising a nonnegative asymmetric matrix, said apparatus comprising:

a memory;

at least one processor coupled to said memory; and a persistent storage device coupled to said memory and said at least one processor;

wherein said persistent storage device comprises machine-executable code which when loaded into said memory causes said at least one processor to be operative to:

obtain access to a first nonnegative factor matrix and a second nonnegative factor matrix obtained by factorizing said nonnegative asymmetric matrix, said first nonnegative factor matrix being representative of initial role membership of said entities, said second nonnegative factor matrix being representative of initial role activity descriptions;

at a given one of said time stamps, while holding a change in said first nonnegative factor matrix constant, update a change in said second nonnegative factor matrix, to reflect time variance of said set of data at said given one of said time stamps, without accessing actual data values at previous ones of said time stamps, said actual data values at said previous ones of said time stamps being privacy-sensitive;

at said given one of said time stamps, while holding a change in said second nonnegative factor matrix constant, update a change in said first nonnegative factor matrix, to reflect said time variance of said set of data at said given one of said time stamps, without accessing said actual data values at said previous ones of said time stamps, said actual data values at said previous ones of said time stamps being privacy-sensitive; and update said role membership of said entities and said role activity descriptions, at said given one of said time stamps, based on said updating of said first and second nonnegative factor matrices;

wherein said persistent storage device comprises a computer-readable storage medium, further comprising a plurality of distinct software modules, each of the distinct software modules being embodied on said computer-readable storage medium, and wherein the distinct software modules comprise an initialization module, an inference module, and an update module; and wherein:

said at least one processor is operative to obtain access by executing said initialization module;

said at least one processor is operative to update said change in said second nonnegative factor matrix and to update said change in said first nonnegative factor matrix by executing said inference module; and said at least one processor is operative to update said role membership of said entities and said role activity descriptions by executing said update module.

20. The apparatus of claim 19, wherein said at least one processor is operative to update said change in said second nonnegative factor matrix and said change in said first nonnegative factor matrix by use of a projected gradient technique.

21. The apparatus of claim 20, wherein said at least one processor is operative to update said change in said second nonnegative factor matrix by:

calculating interaction between a change of entity-role membership and an old role-activity description;

calculating an interaction between an old entity-role membership and a change of role-activity description;

calculating an interaction between said change of entity-role membership and said change of role-activity description;

inferring strength of said change of role-activities description; and adjusting said strength of said change of role-activities description to feasible regions.

22. The apparatus of claim 21, wherein said at least one processor is operative to update said change in said first nonnegative factor matrix by:

calculating said interaction between said change of entity-role membership and said old role-activity description;

calculating said interaction between said old entity-role membership and said change of role-activity description;

calculating an interaction between said change of entity-role membership and said change of role-activity description;

inferring strength of said change of entity-role membership; and adjusting said strength of said change of entity-role membership to feasible regions.

* * * * *